United States Patent
Benz et al.

(10) Patent No.: US 6,299,237 B1
(45) Date of Patent: Oct. 9, 2001

(54) BODYSHELL OF A MOTOR VEHICLE

(75) Inventors: Eberhard Benz, Gärtringen; Andreas Schnitzer, Bodelshausen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/590,609

(22) Filed: Jun. 9, 2000

(30) Foreign Application Priority Data

Jun. 10, 1999 (DE) .............................................. 199 26 352

(51) Int. Cl.⁷ .................................................. B62D 25/00
(52) U.S. Cl. ...................... 296/188; 296/194; 296/203.02
(58) Field of Search ......................... 296/203.01, 203.02, 296/194, 188

(56) References Cited

U.S. PATENT DOCUMENTS 5,303,972   4/1994   Fujii ...................................... 296/194

FOREIGN PATENT DOCUMENTS

| 33 37 708 A1 | 10/1983 | (DE) . |
|---|---|---|
| 41 38 392 A1 | 11/1991 | (DE) . |
| 42 08 700 C2 | 3/1992 | (DE) . |
| 196 32 712 A1 | 8/1996 | (DE) . |
| 197 09 347 C1 | 3/1997 | (DE) . |
| 197 09 349 A1 | 3/1997 | (DE) . |
| 2 345 336 | * 10/1977 | (FR) ..................................... 296/188 |

* cited by examiner

Primary Examiner—Joseph D. Pape
Assistant Examiner—Patricia Engle
(74) Attorney, Agent, or Firm—Crowell & Moring LLP

(57) ABSTRACT

A bodyshell of a motor vehicle has a front-end structure which has a lower and an upper longitudinal-member plane and in the region of a passenger cell is provided with lateral longitudinal sills. A respective composite strut arrangement is provided on both sides of the vehicle, each said arrangement extending obliquely downwards and also rearwards between the associated upper longitudinal member and the associated lateral longitudinal sill.

10 Claims, 2 Drawing Sheets

BODYSHELL OF A MOTOR VEHICLE

The invention relates to a bodyshell of a motor vehicle having a front-end structure which has lower front-end longitudinal members and also upper longitudinal members which are adjoined in each case by a spring-strut bracket and which run into lateral A-pillars which are downwardly connected to lateral longitudinal sills of the passenger cell.

BACKGROUND

A bodyshell of this type is generally known in the case of Mercedes-Benz cars. The bodyshell has a front-end structure a in which a drive assembly and also further functional assemblies are accommodated. The front-end structure is provided with a lower and with an upper longitudinal-member plane. The two lower front-end longitudinal members merge in the region of the passenger cell into lateral longitudinal sills into which a number of supporting pillars of the passenger cell, in particular the A- and B-pillars, run. The upper longitudinal members support a radiator cross member in a front region. Spring-strut brackets are connected to the upper longitudinal members, the said brackets continuing, integrated in wheel fittings, as far the lower longitudinal members.

In the case of a bodyshell of a motor vehicle according to DE 197 09 347 Cl or DE 197 09 349 Al it is also known to provide a wheel-house support of strut-like configuration. The said support extends from the associated, lower front-end longitudinal member obliquely rearwards and upwards to a supporting-pillar and front-wall region.

The object of the invention is to provide a bodyshell of the type mentioned at the beginning which makes improved energy absorption possible in the case of a frontal impact.

SUMMARY

A bodyshell according to this invention has respective composite strut arrangements provided on both sides of the vehicle, the said arrangement extending obliquely downwards in the vertical direction of the vehicle, and also rearwards in the longitudinal direction of the vehicle, between the associated upper longitudinal member and the associated lateral longitudinal sill and/or the associated A-pillar. In the case of frontal impact loads, an additional force route is provided via the particular composite strut arrangement, as a result of which impact loads introduced into the upper longitudinal members or the spring-strut bracket are not exclusively passed on into the A-pillar in the window-breast region, but are additionally also passed on downwards into the particular longitudinal sill or into a A-pillar foot. The respective additional composite strut arrangements also provide additional stiffening for the upper longitudinal members, the said stiffening preventing the upper longitudinal members from buckling during a corresponding frontal impact. In addition, the composite strut arrangements block movement of the front wheel towards the front wall of the passenger cell, as a result of which intrusions of the front wall due to the displaced front wheel can effectively be prevented. The composite strut arrangements therefore achieve an improved distribution of force during corresponding frontal impact loads in the region of the passenger cell. This results in an additional force route, in particular for forces which are introduced into the shock-absorber strut bracket. One force route passes via the shock-absorber strut bracket into the lower front-end longitudinal member, and the second force route passes via the upper longitudinal-member plane into the A-pillar. The third, additional force route runs via the composite strut arrangement into the lateral longitudinal sill. The result is therefore an optimum flow of force over three paths. In addition, because the forces can additionally be conducted away downwards in the vertical direction of the vehicle via the composite strut arrangements, the extremely critical connection, as regards the operating strength, of the upper longitudinal-member plane to the A-pillar is clearly relieved of load.

In a refinement of the invention, each composite strut arrangement ends in its lower end region at a front side of the connecting region between the A-pillar and longitudinal sills. This advantageously results in force being introduced at the intersecting point between the A-pillar and the longitudinal sill. The passenger cell has particularly high rigidity in this region, so that even high forces can be absorbed via the composite strut arrangement.

In a further refinement of the invention, each composite strut arrangement is formed in each case by a single-piece sheet-metal profile which is joined with the aid of connecting flanges to the upper longitudinal member at one end and to the connecting region between the A-pillar and longitudinal sill at the other end. Welding is preferably undertaken in the region of the connecting flanges, so that extremely stable connecting regions are produced. The composite strut arrangement is therefore integrated into the front-end structure in a force-transmitting manner.

BRIEF DESCRIPTION OF THE DRAWINGS

Further advantages and features of the invention emerge from the claims. In the following, preferred exemplary embodiments of the invention are described and illustrated with reference to the drawings.

DETAILED DESCRIPTION

Figure 1:
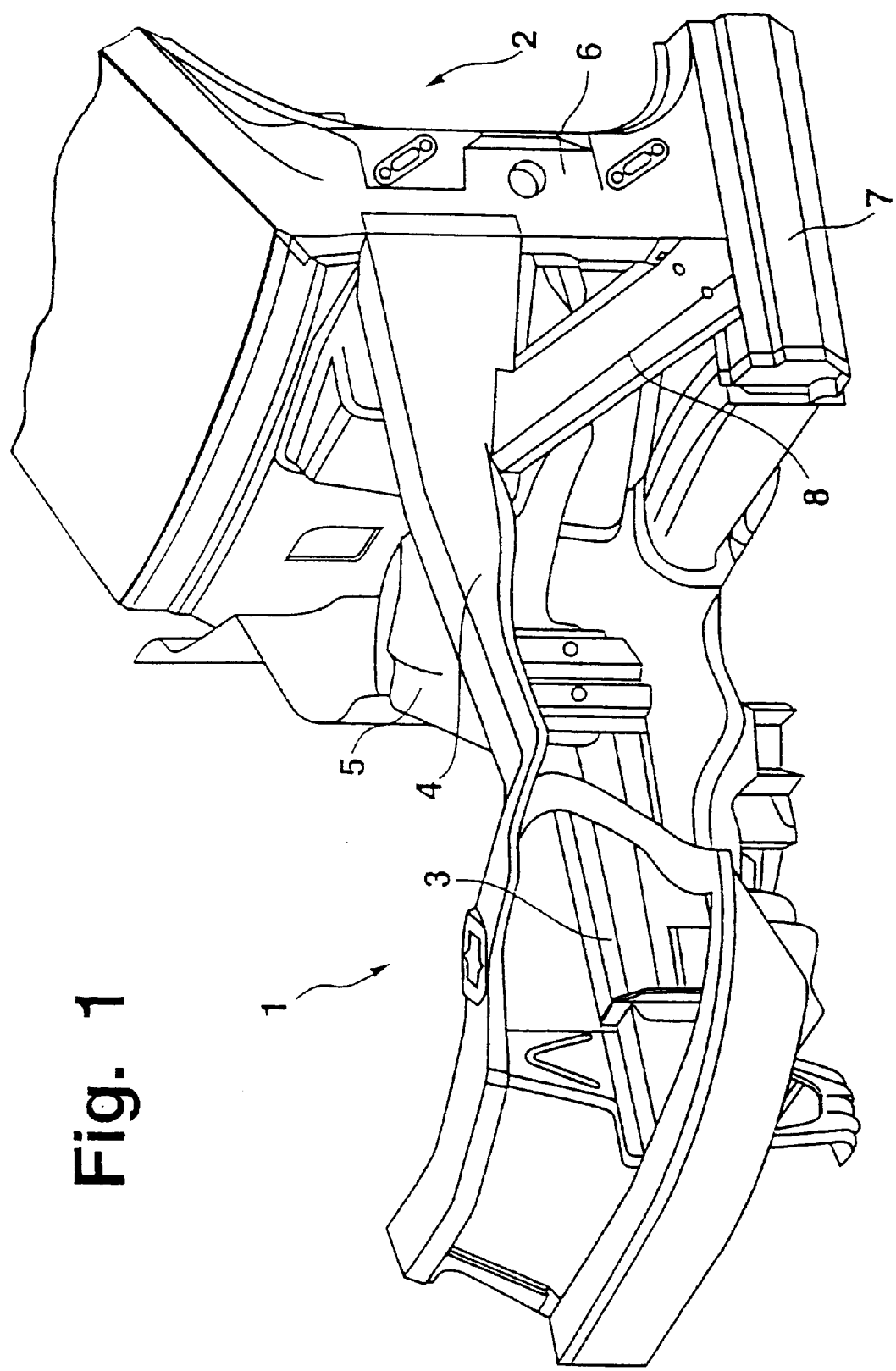
FIG. 1 shows, in a perspective illustration, a left half—as seen in the direction of travel—of a front part of one embodiment of a bodyshell according to the invention, in which a connection of a front-end structure to a passenger cell is illustrated.

A bodyshell for a car has, according to FIG. 1, a front-end structure 1 which is connected to the rear, in the longitudinal direction of the vehicle, to a passenger cell 2. The front-end structure 1 is provided, in a manner known in principle, with two lower front-end longitudinal members 3 of which only a left front-end longitudinal member 3—as seen in the direction of travel—is illustrated in FIG. 1. In addition, the front-end structure 1 has a respective upper longitudinal member 4 on both sides of the vehicle, which longitudinal member is adjoined by a spring-strut bracket 5 and a wheel fitting (not illustrated in greater detail). The wheel fitting is connected in its lower region to the associated, lower front-end longitudinal member 3.

The two upper longitudinal members 4 are connected in their rear end region—in the longitudinal direction of the vehicle—to a respective A-pillar 6 which serves as the supporting pillar and is part of the passenger cell 2. A front wall extends between the A-pillars 6 in a manner which is known in principle. The two A-pillars are connected in their foot region to a lateral longitudinal sill 7 of the passenger cell 2, which sill, as seen in the longitudinal direction of the vehicle, ends towards the front at a rear side of the associated wheel fittings.

FIG. 1 illustrates, as seen in the normal direction of travel, a left half of the front-end structure 1 and also of the front section of the passenger cell 2. The corresponding right half is of corresponding mirror-symmetrical design. The lower front-end longitudinal members 3 are situated offset further inwards towards the centre of the vehicle with respect to the upper longitudinal members 4.

In order to provide an additional support for each upper longitudinal member 4 and also an additional force route with regard to the absorption of frontal impact loads, a composite strut arrangement in the form of a single-piece composite strut profile 8 extends between a lower flange of each upper longitudinal member 4 and the longitudinal sill 7 situated below, the said composite strut profile 8 running from the upper longitudinal member 4 rearwards, in the longitudinal direction of the vehicle, and also downwards, in the vertical direction of the vehicle, so that an oblique shape is provided. The composite strut profile 8 is essentially of rectilinear design, so that an oblique, rectilinear connection between the upper longitudinal member 4 and the longitudinal sill 7 is provided. In the exemplary embodiment according to FIG. 1, the composite strut profile 8 ends with its lower end region in the front corner region of the connecting intersection between the A-pillar 6 and the longitudinal sill 7, and therefore in the region in which the foot region of the A-pillar 6 runs into the longitudinal sill 7.

The composite strut profile 8 has a cross-sectionally U-like shell profile which is opened towards the centre of the vehicle. For reinforcement purposes, it has lateral longitudinal flanges which are designed as connecting flanges in the opposite end regions of the composite strut profile 8 and are welded to associated connecting points on the upper longitudinal member 4 at one end and on the longitudinal sill 7 or the A-pillar 6 at the other end.

Figure 3:
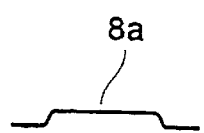
FIG. 3 shows a cross section through a composite strut profile of the front-end structure according to FIG. 2, along the sectional line III—III in FIG. 2.

The profile illustration in FIG. 3 approximately corresponds to the profile cross section of the composite strut profile 8. Instead of an open composite strut profile 8, a closed hollow profile may also be provided in the same manner. In principle, the composite strut arrangement can also consist of at least one solid profile, hollow profiles having weight advantages over this.

Figure 2:
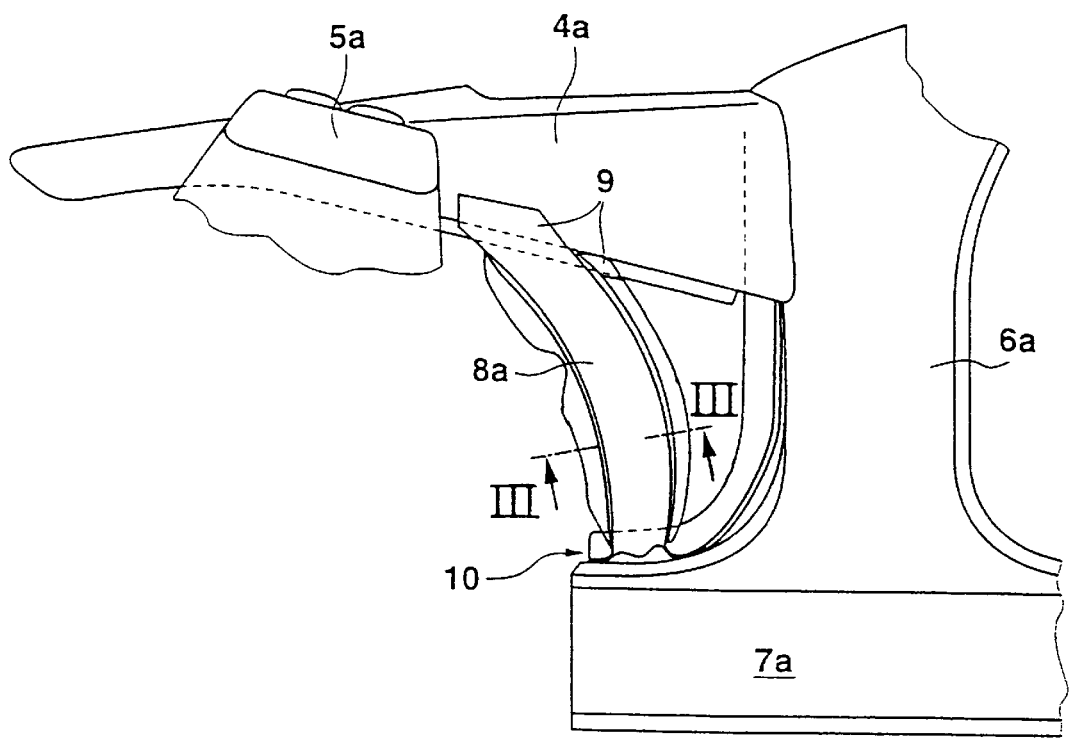
FIG. 2 shows, in a side view, a further embodiment of part of a bodyshell according to the invention similar to FIG. 1.

In the exemplary embodiment according to FIGS. 2 and 3, a right side region (in the normal direction of travel) of a bodyshell of a car is illustrated, the bodyshell essentially corresponding to the previously described bodyshell according to FIG. 1. Parts of the bodyshell which are identical in terms of construction and function are therefore provided with the same reference numbers with the addition of the letter a. The sole difference in the case of the bodyshell according to FIG. 2 is that the composite strut profile 8a has a curvature, as a result of which it does not run into the intersecting region between the A-pillar 6a and the longitudinal sill 7a, but rather runs onto the longitudinal sill 7a in front of the A-pillar 6a. The composite strut profile 8a has a foot section 10 which is designed to provide a flat connection in the region of corresponding profilings of the upper side of the longitudinal sill 7a in order to be able to obtain corresponding weldings. In addition, the composite strut profile 8a has upper connecting flanges 9 with which the fixed connection to a lower side of the upper longitudinal member 4a is likewise obtained by welding. The composite strut profile 8a is also of cross-sectionally U-like design (FIG. 3) and open towards the centre of the vehicle.

Although the invention has been described in detail with reference to certain preferred embodiments and specific examples, variations and modification exist within the scope and spirit of the invention as described and as defined in the following claims.

What is claimed is:

1. A bodyshell of a motor vehicle, comprising:
    a front-end structure which has lower front-end longitudinal members and upper longitudinal members which are adjoined in each case by a spring-strut bracket and which run into lateral A-pillars which are downwardly connected to lateral longitudinal sills of a passenger cell of the motor vehicle; and
    respective composite strut arrangements provided on both sides of the vehicle, each one of said arrangements having an end including a connecting flange, each one of said arrangements extending obliquely downwards in the vertical direction of the vehicle and rearwards in the longitudinal direction of the vehicle between the associated upper longitudinal member and at least one of the associated lateral longitudinal sill and A-pillar, said connecting flange connected to one of the longitudinal sill and A-pillar to absorb frontal impact loads.

2. A bodyshell according to claim 1, wherein each composite strut arrangement ends in its lower end region at a front side of a connecting region formed between the associated A-pillar and longitudinal sill.

3. A bodyshell according to claim 1 wherein each composite strut arrangement is formed by a single-piece sheet-metal profile which is joined with the aid of said connecting flanges to the associated upper longitudinal member at one end and to the connecting region between the associated A-pillar and longitudinal sill at the other end.

4. A bodyshell according to claim 3, wherein the sheet-metal profile has a U-like cross section.

5. A bodyshell according to claim 3 wherein the sheet-metal profile having at least a portion of a curved portion between the associated upper longitudinal member at one end and the connecting region at the other end.

6. A bodyshell according to claim 3 wherein the sheet-metal profile is rectilinear.

7. A bodyshell according to claim 3 wherein each of said strut arrangements having a lateral longitudinal flange.

8. A motor vehicle bodyshell including a passenger cell adapted for absorbing frontal impact loads, said bodyshell comprising:
    a front end structure having a lower front-end longitudinal member, an upper longitudinal member, a spring-strut member connected to said lower front-end longitudinal member and said upper longitudinal member, an A-pillar connected to said upper longitudinal member and a longitudinal sill connected to said A-pillar; and
    a strut member adjacent said upper longitudinal member, said strut member having one end, an opposite end, and a pair of connecting flanges, one of said pair of connecting flanges on said one end and connected to said upper longitudinal member, the other of said pair of connecting flanges on said opposite end and connected to one of said A-pillar and said longitudinal sill to absorb frontal impact loads.

9. A motor vehicle bodyshell as claimed in claim 8 wherein said A-pillar and said longitudinal sill forming a connecting region, and said strut member having a lower end, said lower end adjacent said connecting region.

10. A motor vehicle bodyshell as claimed in claim 8 wherein said strut member is formed of a unitary planar member, one of said pair of connecting flanges adjacent to said upper longitudinal member and the other of said pair of connecting flanges adjacent to said connecting region.

* * * * *